United States Patent [19]

Myers

[11] 4,151,933
[45] May 1, 1979

[54] POWDER MEASURE DEVICE
[75] Inventor: Earl D. Myers, Scotch Plains, N.J.
[73] Assignee: Ohaus Scale Corporation, Florham Park, N.J.
[21] Appl. No.: 759,452
[22] Filed: Jan. 14, 1977
[51] Int. Cl.² ............................................. G01F 11/24
[52] U.S. Cl. .................................. 222/288; 222/308; 222/325; 222/548
[58] Field of Search ............... 222/288, 289, 292, 306, 222/307, 308, 440, 325, 548; 141/367

[56] References Cited

U.S. PATENT DOCUMENTS

| | | | |
|---|---|---|---|
| 1,861,734 | 6/1932 | Bergmann | 222/288 X |
| 2,550,827 | 5/1951 | Lachmiller | 222/308 |
| 2,655,291 | 10/1953 | Roundtree | 222/288 X |
| 3,147,890 | 9/1964 | Mittelsteadt | 222/306 X |
| 4,060,105 | 11/1977 | Feldeisen et al. | 222/325 X |

FOREIGN PATENT DOCUMENTS 401850   1/1967   Australia .................................. 222/306

Primary Examiner—Robert J. Spar
Assistant Examiner—Frederick R. Handren
Attorney, Agent, or Firm—Robert R. Jackson

[57] ABSTRACT

A powder measure device which includes a drum having two apertures and a metering piston assembly wherein the metering piston includes means for changing the diameter of the operative end of the metering piston. Thereby, only a single metering piston assembly is required and is operative with either bore of the drum. To insure a uniform discharge from the device, the device includes an adjustable baffle.

11 Claims, 7 Drawing Figures

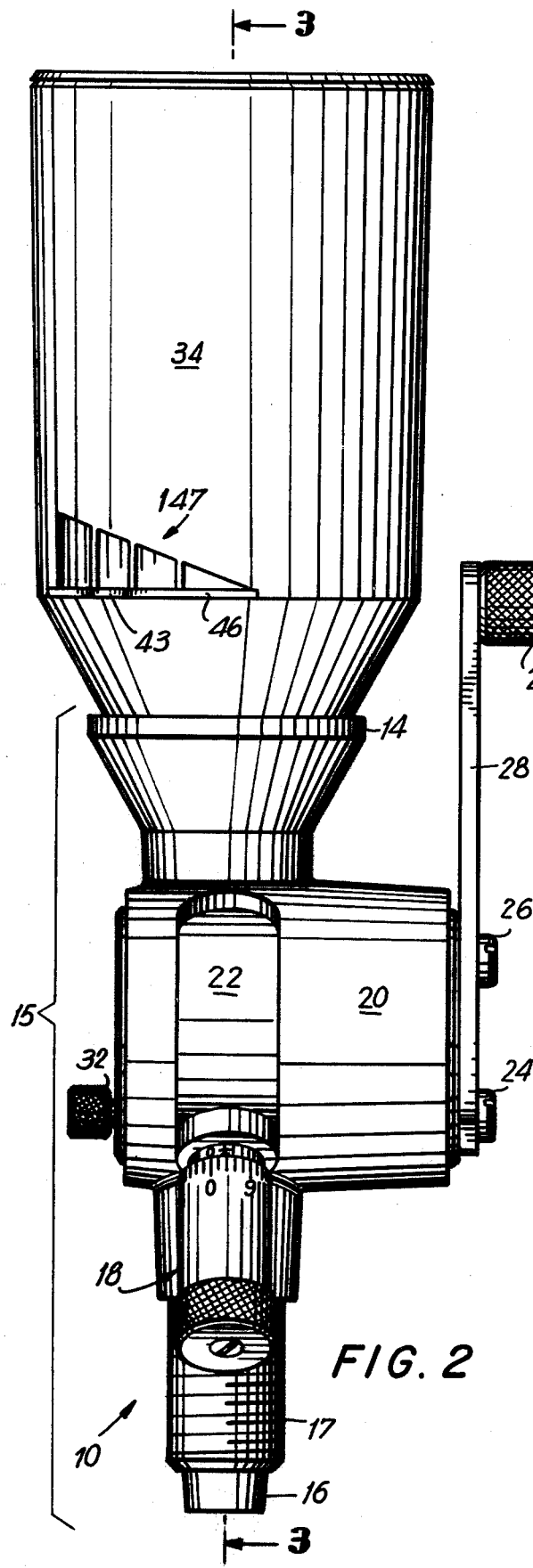
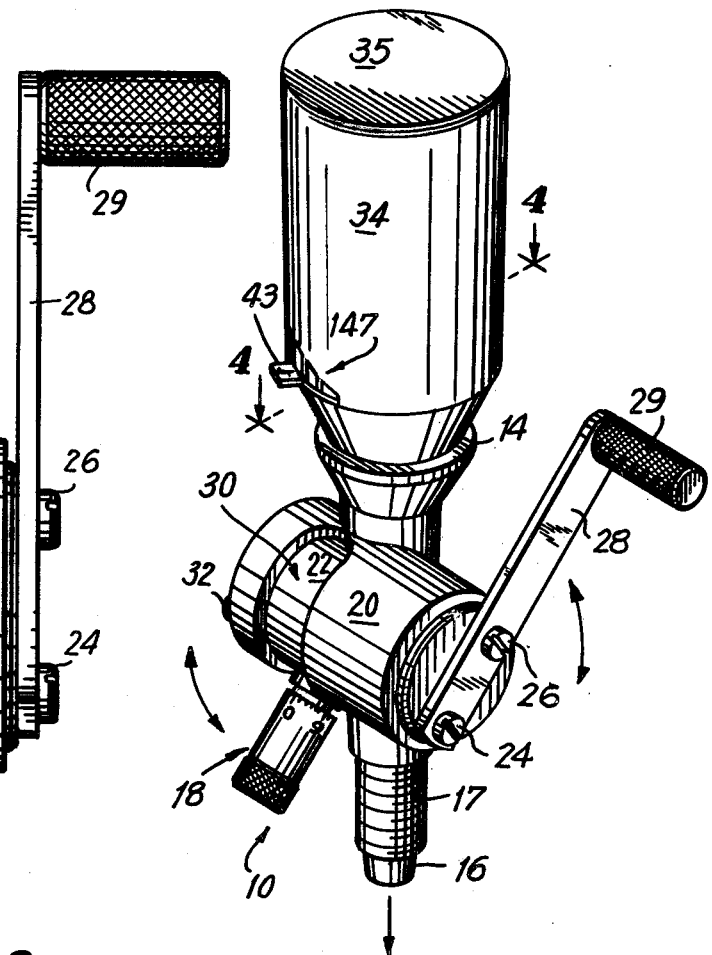
FIG. 1
FIG. 2

POWDER MEASURE DEVICE

BACKGROUND OF THE INVENTION

Many hunters and target shooters reload their own ammunition. During the reloading process, it is necessary to measure a precise weight of gun powder. Although many reloaders use scales or balances to measure an individual charge, it is desirable to employ an apparatus which will quickly and accurately provide a metered quantity of gun powder. Such devices are generally referred to as powder measure devices and typically comprise a drum having a transversely extending bore. A metering piston assembly is secured to the drum and a metering piston extends into the bore. Means are provided for varying the position of the piston within the bore whereby the volume of the bore is variable. The drum is generally received in a housing which includes a gun powder reservoir secured to the top thereof. When the drum is rotated so that the bore faces upwardly, the powder from the reservoir empties into the opened end of the bore. Upon rotation of the drum, the bore is moved such that its open end communicates with the discharge end of the powder measure device and, thereby, powder which fills the bore is discharged into a shell which is positioned beneath the device. Thereby, a metered quantity of powder is discharged from the device upon rotation of the drum.

Individuals who reload their ammunition will often reload both pistol ammunition and rifle or shotgun ammunition. Obviously, a larger quantity of gun powder is required with a shotgun or rifle shell as compared to a pistol shell. However, although the quantity of gun powder may vary depending upon the nature of the shell which is being reloaded, it is desired to maintain the same tolerances in either case. This requirement presents a problem for the following reasons. When a large quantity of gun powder is to be metered and discharged, the volume of the bore in the drum must obviously be large. In order to secure such a large volume, typically the diameter of the bore will be fairly large, for example approximately one inch. If one attempted to meter a small quantity of material by using a drum having a large diameter bore, it is clear that a small change in the position of the metering piston would represent a significant change in the volume of the bore. Thus, it is difficult to make small changes in the volume of a large diameter bore when attempting to meter a small quantity of material.

In the past, two approaches have been employed to overcome this problem. First, manufacturers have supplied powder measure devices with two separate drums, one having a large diameter bore with a large diameter piston and another drum having a small diameter bore with a small diameter piston. With this approach, a reloader would change measuring drums when going from a large size shell to a small size shell or vice-a-versa.

Another approach has utilized a single drum having two bores of different diameters and a metering piston positioned in each of the bores. With this arrangement, means were also provided for diverting the material from the reservoir to one of the two bores. A device of this type is shown in U.S. Pat. No. Des. 230,880 and is sold by Ohaus Scale Corporation of Florham Park, New Jersey under the designation Model No. 7200.

Although devices of the type described above have operated satisfactorily, it is evident that they necessarily require additional parts which may be used infrequently and which may be mislaid. For example, in the instance where a powder measure device is supplied with two drums, only one drum is used at one time. Thus, the other drum may be mislaid and is not used when the first drum is being operated. Similarly, with the Ohaus Powder Measure Device described above, the device includes two metering pistons and only one is used at any one time. Although each of the metering pistons in the Ohaus device is mounted in the drum and thereby will not be lost, the necessity of providing an additional metering piston increases the cost of the device. The object of this invention is to provide a powder measure device which does not employ anymore parts than are employed in single cavity powder measuring devices yet which has the capability of dual drum powder measure devices.

SUMMARY OF THE INVENTION

A powder measure device which includes a drum having two bores and a metering piston assembly positioned in one of said bores. One of said bores has a large diameter and the upper portion of the other bore has a small diameter. The metering piston is provided with means whereby it can be accommodated in either of said bores. Preferably, the metering piston includes a slidably mounted collar having a diameter equal to the diameter of the larger bore. The collar is slidably mounted on a piston stem and the upper end of the piston stem has a diameter substantially equal to the diameter of the smaller bore. Preferably, the smaller bore has a lower, increased diameter portion which receives the collar.

To change from one bore to another, the drum is removed from the device housing, rotated 180°, and reinserted in the housing. The metering piston assembly is then positioned in the drum.

The device also preferably includes an adjustable baffle positioned in the lower portion of the reservoir. The baffle is comprised of two apertured discs, one of the discs being stationary with respect to the reservoir and the other being rotatable. Upon rotation of one of the discs, the apertures in the discs move in and out of registry, whereby feeding of the material from the reservoir to the drum may be controlled.

DESCRIPTION OF THE DRAWINGS

FIG. 1 is a perspective view of a preferred embodiment of my invention.

FIG. 2 is a front view of the apparatus shown in FIG. 1.

DESCRIPTION OF PREFERRED EMBODIMENT

Figure 3:
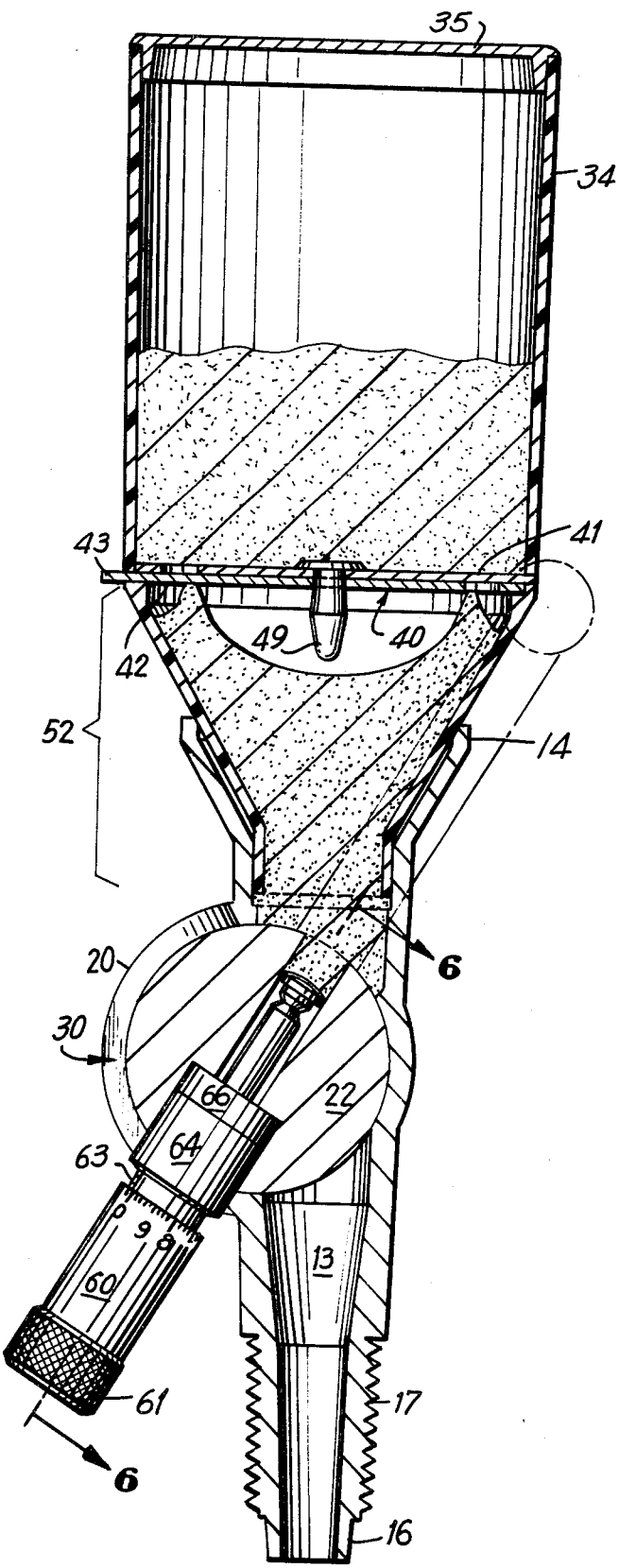
FIG. 3 is a side sectional view taken along the section lines 3—3 of FIG. 2.

Referring to FIGS. 1, 2 and 3, the powder measure device 10 shown therein is comprised of a housing 15 having an inlet end 14 and a discharge end 16. As shown in FIG. 3, a conduit 13 extends through the housing 15 from the inlet end to the discharge end. Intermediate the inlet end 14 and the discharge end 16, the portion 20 of the housing 15 defines a transversely extending chamber in which drum 22 is rotatably received. The portion of the housing 20 also includes a slot 30 shown in FIG. 1. One end of a metering piston assembly 18 is received in the drum 22 and the remainder of the assembly extends outwardly through the slot 30 as best seen in FIG. 1.

A handle is secured to one planar side of the drum 22 by machine bolts 24, 26. A knob 29 is secured to the handle 28. At the other planar side of the drum 22, a locking bolt 32 is provided.

Figure 4:
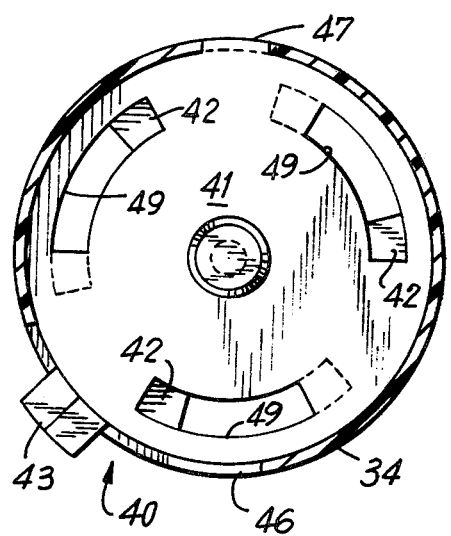
FIG. 4 is a partial sectional view taken along the sections lines 4—4 of FIG. 1.

As shown in FIGS. 1, 2 and 3, a reservoir 34, for containing gun powder or other flowable material, is disposed on top of the upper end 14 of the housing 15. Preferably, the reservoir 34 is constructed of molded plastic and is received within the upper end 14 of the housing 15 with a slight interference fit. The reservoir 34 may be closed by a lid 35. Within the reservoir, an adjustable baffle 40 is provided. As shown in FIG. 3, the adjustable baffle 40 is comprised of two apertured discs, 41 and 42. When the reservoir 34 is assembled, the lower disc 42 is placed within the reservoir through the top thereof and then moved into the position shown in FIG. 3. During the positioning of the lower disc 42, the tab 43 which extends from the disc 42 is placed in the slot 46 shown in FIG. 2. Thereafter, and in similar manner, the upper disc 41 is placed inside the reservoir 34, through the top thereof, and is positioned so that a smaller tab 47, shown in FIG. 4, is received in a correspondingly sized slot in the rear of the reservoir 34. In this manner, the upper disc 41 is secured against rotational movement. When the discs 41 and 42 have been positioned within the reservoir 34, the connecting member 49 is inserted through the center aperture in each of the discs 41, 42. The connecting member 49 is preferably plastic and is shaped, as shown in FIG. 3, so as to urge the discs 41, 42 into face abutting relation. Thereby, the discs 41 and 42 are maintained in face abutting relation and the lower disc 42 may be rotated with respect to the upper disc 41 by moving the tab 43.

Each of the discs 41 and 42 is provided with apertures. For example, as shown in FIG. 4, the disc 41 is provided with segmented apertures 49. Apertures of the same size and shape are located in the disc 42. Thus, by rotation of the disc 42 with respect to the disc 41, the apertures in the two discs will move into and out of registry. Thereby, the level of powder in the lower portion 52 of the reservoir 34 may be controlled. Additionally, by appropriate movement of the tab 43, the apertures in the two discs may be moved completely out of registry, whereby the upper portion of the reservoir 34 is closed. This is beneficial in the event that a reloader desires to use another type of gun powder. In other words, the upper portion of the reservoir may be closed and that reservoir may be used to store a particular type of gun powder and another reservoir may be placed in the powder measure device.

Figure 6:
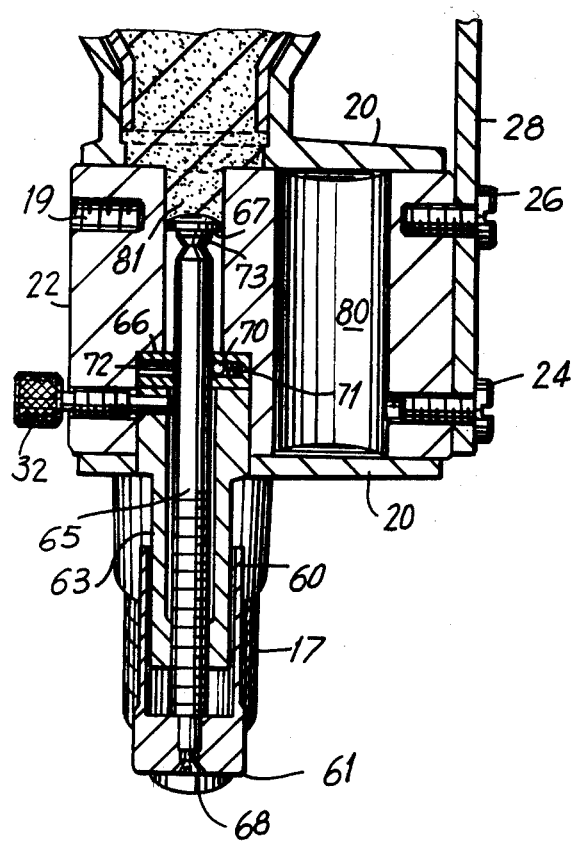
FIG. 6 is a sectional view taken along the section lines 6—6 of FIG. 3.

As best shown in FIG. 6, the drum 22 includes two bores which extend therethrough, transverse to the axis of the drum. Specifically, the first bore 81 has an upper portion and a lower portion, wherein the upper portion has a smaller diameter than the lower portion. The second bore 80 is preferably of uniform diameter and preferably the diameter of the second bore 80 is equal to the diameter of the lower portion of the first bore 81. In FIG. 6, the metering portion 65 is shown positioned in the first bore.

Figure 5:
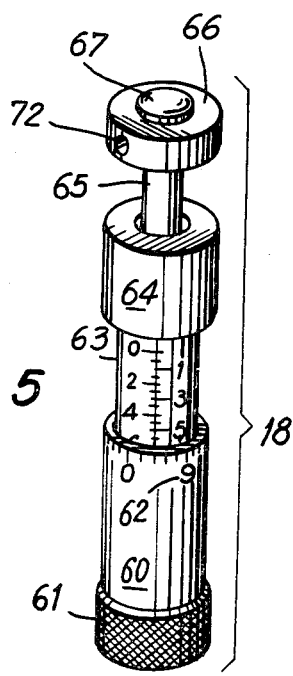
FIG. 5 is a perspective view of a sub-combination of the apparatus shown in FIGS. 1, 2 and 3.

The metering piston assembly 18 is shown in FIG. 5. Referring to FIGS. 5 and 6, the metering piston assembly 18 is comprised of a sleeve 63 having a larger diameter upper portion 64. The metering piston 65 extends through the sleeve 63 and is threadedly connected thereto at the lower portion of the sleeve 63. The lower end of the metering piston 65 is connected to a thimble 60 by screw 68. The thimble 60 extends around the lower portion of the sleeve 63. Thus, when the thimble 60 is rotated with respect to the sleeve 63, the metering piston 65 is moved axially with respect to the sleeve 63. To facilitate rotation of the thimble 60, the lower portion thereof is preferably knurled as shown at 61 in FIG. 5. In order to mount the sleeve 63 in the drum 22, an aperture is provided in the upper portion 64 of the sleeve 63. As seen in FIG. 6, the locking bolt 32 is threadedly received in the drum 22 and extends through the aperture in the upper portion 64 of the sleeve 63. Additionally, as may be seen in FIG. 6, the locking bolt 32 also serves to lock the metering piston in position with respect to the sleeve 63.

Referring to FIGS. 5 and 6, a collar 66 is slidably disposed on the upper end of the metering piston 65. The collar 66 includes a detent ball and spring 70 and 71, respectively. To facilitate the positioning of the detent ball and spring 70 and 71, an aperture 72 is provided in the collar 66.

As shown in FIG. 6, the diameter of the distal end 67 of the metering piston 65 is substantially equal to the diameter of the upper portion of the bore 81 and the diameter of the remainder of the piston 65 is less than the diameter of the distal end 67. Thus, the distal end 67 of the metering piston 65 closes the bore 81, and the position of the distal end 67, which is adjustable by rotating the thimble 60, defines the volume of powder to be discharged.

As may be noted from FIG. 6, the diameter of the collar 66 is preferably substantially equal to the diameter of the upper portion 64 of the sleeve 63. Thus, when the metering piston 65 is disposed within the small diameter bore 81, the collar 66 is adjacent to the top portion 64 of the sleeve 63 and the collar 66 and the portion 64 are received in the larger diameter, lower portion of the bore 81.

Figure 7:
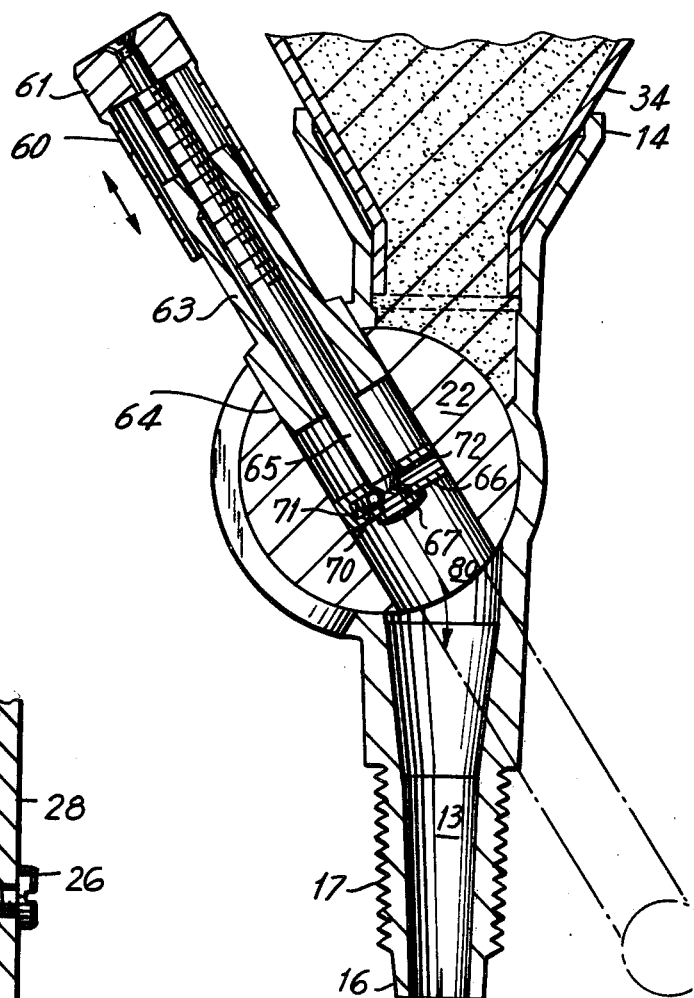
FIG. 7 is a side sectional view of the apparatus shown in FIG. 2 with the drum rotated towards discharge position.

When it is desired to use the device to measure larger quantities of powder, the following procedure is employed. The locking nut 32 is backed out to an extent sufficient to permit removal of the metering piston assembly 18. Upon removal, the drum 22 is withdrawn from the chamber 20 by slidably moving the drum to the right as shown in FIG. 6. The handle 28 is removed from the drum and mounted on the other planar side of the drum 22. Similarly, the locking nut 32 is removed and mounted in the corresponding hole on the other planar side of the drum 22. The drum 22 is then reinserted in the chamber 20. Upon completion of this step, the bore 80 will then be positioned in vertical alignment with the discharge and inlet end portions of the housing 15. Thereupon, the collar 66 is slidably moved to the end of the metering piston 65 until the detent ball 70 engages the relieved portion 73 adjacent the distal end of the metering piston 65. In this manner, the collar 66 is releasablly locked to the distal end portion of the metering piston 65. Thereupon, the upper portion of the metering piston assembly 18 is inserted through the slot 30 shown in FIG. 1 and into the bore 80 of the drum 22. The locking bolt 32 is then advanced to a point sufficient to lock the sleeve 63 with respect to the drum 22. At the completion of these steps, the metering piston will then be disposed within the drum 22 as shown in FIG. 7, wherein it will be seen that the collar 66 now closes the upper portion of the bore 80. Thereafter, the thimble 60 is rotated so as to position the collar 66 and the distal end 67 of the metering piston so as to define the desired volume within the bore 80. When the desired volume has been attained, the piston is locked in place by further advancing the locking bolt 32. When the desired volume has been defined, the reservoir 34 may then be placed on the upper portion 14 of the housing 15 and the baffle 40 opened to admit powder to the upper portion 14. Thereafter, the drum 22 may be rotated so as to place the open portion of the bore 80 in communication with either the upper end 14 or the lower end 16 of the housing 15. Thereby, a metered quantity of powder is delivered to the lower end 16 and is discharged into a shell, as shown in FIG. 7.

To provide reference points to determine the degree to which the metering piston 65 extends into a bore, the sleeve 63 and the thimble 60 may be provided with graduated indicia as shown in FIG. 5. Similarly, to provide an indication of the extent to which the apertures in the discs 41 and 42 are in registry, one side portion of the reservoir 34 may be provided with indicia 147. As shown in FIG. 2, the indicia 147 indicates that movement of the tab 43 to the left will increase the registry of the apertures in the discs 41 and 42. When the tab 43 is positioned to the extreme right of the slot 46 shown in FIG. 2, the apertures and the discs 41 and 42 are completely out of registry and the upper portion of the reservoir 34 is therefore closed.

Referring to FIG. 6, the apertures which receive the machine bolts 24 and 26, the aperture which receives the locking bolt 32, and the aperture 19 should all preferably be of the same diameter and include the same thread. In this manner, reversal of the handle and locking nut will be facilitated. Although FIG. 6 shows the drum 22 as including two threaded apertures on each planar side, it is possible to provide only a single threaded aperture on each planar side, provided that the single aperture on each side permits the locking nut to perform a locking function and means are provided to secure the handle against rotation relative to the drum 22.

When using the device shown in the drawings, it is helpful to mount the device on a fixture which maintains the device in spaced relation from a table on which a shell may be positioned. To facilitate mounting of the device on such a fixture, the lower portion 16 of the housing 15 may be threaded as shown in FIG. 7 at 17.

Although a preferred embodiment of my invention has hereinafter been described, it will be appreciated that other embodiments of my invention may be perceived by those skilled in the art, without departing from the scope of my invention as defined by the claims appended hereto.

I claim:

1. An apparatus for discharging a metered quantity of flowable material which comprises:
   (a) a housing having an inlet end and a discharge end, said inlet end being adapted to receive a reservoir for containing flowable material, said housing including a conduit which extends from said inlet end to said discharge end and a chamber which extends transversely of said conduit;
   (b) a drum rotatably positioned within said chamber, said drum including at least first and second bores extending therethrough, the axis of each of said bores being transverse to the axis of said drum, said first bore including an upper portion having a diameter smaller than the lower portion of said first bore, and said second bore including an upper portion having a diameter larger than the upper portion of said first bore;
   (c) a metering piston assembly removably disposed in the lower portion of one of said bores, the lower portion of both of said bores being adapted for receiving said metering piston assembly, said metering piston assembly comprising,
   (i) a sleeve,
   (ii) a metering piston movably disposed within said sleeve, the distal end of said piston extending into the upper portion of said bore and having outer diameter substantially equal to the diameter of the upper portion of said first bore,
   (iii) means mounted on said piston for increasing the outer diameter of the distal end of said piston to substantially equal the diameter of the upper portion of said second bore when said metering piston assembly is disposed in the lower portion of said second bore, and
   (iv) means for adjusting the position of the distal end of said piston within said bore; and
   (d) means for securing said metering piston assembly to said drum.

2. The apparatus of claim 1 wherein said securing means is also operable to lock said metering piston with respect to said sleeve.

3. The apparatus of claim 2 which further includes a handle secured to said drum and said drum further includes means on each planar side of said drum for securing said handle to said drum.

4. The apparatus of claim 2 wherein the diameter of said second bore is uniform and the diameter of the lower portion of said first bore is substantially equal to the diameter of said second bore.

5. The apparatus of claim 2 which further includes:
   (a) a reservoir disposed on said housing at said inlet end; and
   (b) adjustable baffle means disposed within the exit end of said reservoir for controlling the flow of flowable material from said reservoir into said inlet end of said housing.

6. The apparatus of claim 5 wherein said adjustable baffle is comprised of two apertured discs maintained in face abutting relation, one of said discs being movable with respect to the other for controlling the extent of registry between the apertures in said discs.

7. An apparatus for discharging a metered quantity of flowable material which comprises:
   (a) a housing having an inlet end and a discharge end, said inlet end being adapted to receive a reservoir for containing flowable material, said housing including a conduit which extends from said inlet end to said discharge end and a chamber which extends transversely of said conduit;
   (b) a drum rotatably positioned within said chamber, said drum including first and second bores extending therethrough, the axis of each of said bores being transverse to the axis of said drum, said second bore having a uniform diameter, said first bore including a lower portion having a diameter substantially equal to the diameter of said second bore and the diameter of the upper portion of said first bore being smaller than the diameter of said second bore;

(c) a metering piston disposed in one of said bores, the distal end of said piston being disposed in the upper portion of said bore, the outer diameter of at least the distal end of said piston being substantially equal to the diameter of the upper portion of said first bore;

(d) a collar slidably mounted on said piston, the outer diameter of said collar being substantially equal to the diameter of said second bore;

(e) means for moving said piston within said bore; and (f) means for locking the position of said piston with respect to said drum.

8. The apparatus of claim 7 which further includes means for releasably locking said collar to the distal end of portion of said piston.

9. The apparatus of claim 8 which further includes:

(a) a sleeve, said piston extending through said sleeve and being threaded thereto, the upper portion of said sleeve being received in said drum and secured to said drum by said locking means; and (b) a thimble surrounding the lower portion of said sleeve, the proximal end of said piston being secured to said thimble.

10. The apparatus of claim 9 wherein the diameter of said collar is substantially equal to the diameter of the upper portion of said sleeve.

11. The apparatus of claim 7 wherein each planar side of said drum includes at least one threaded aperture, said locking means being received in one of said threaded apertures, and wherein said apparatus further includes a handle, said handle being secured to the other planar side of said drum by a bolt extending into the other of said threaded apertures.

* * * * *